United States Patent [19]
Liwszyc

[11] Patent Number: 6,156,365
[45] Date of Patent: *Dec. 5, 2000

[54] PROCESS FOR PRODUCING FULLY GELATINIZED HULLED OATS

[75] Inventor: Danek Liwszyc, Noranda, Australia

[73] Assignee: The Quaker Oats Company, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,277

[22] PCT Filed: Jun. 8, 1995

[86] PCT No.: PCT/AU95/00338

§ 371 Date: Mar. 17, 1997

§ 102(e) Date: Mar. 17, 1997

[87] PCT Pub. No.: WO95/33384

PCT Pub. Date: Dec. 14, 1995

[30] Foreign Application Priority Data

Jun. 8, 1994 [AU] Australia ............... PM 6145

[51] Int. Cl.⁷ ..................... A23L 1/00
[52] U.S. Cl. ............ 426/510; 426/462; 426/468; 426/618
[58] Field of Search .................. 426/618, 619, 426/620, 621, 465, 468, 462, 457, 510

[56] References Cited

U.S. PATENT DOCUMENTS

| | | | |
|---|---|---|---|
| 2,930,697 | 3/1960 | Miller | 99/80 |
| 2,999,018 | 9/1961 | Huffman et al. | 99/83 |
| 3,640,728 | 2/1972 | Ronai et al. | 99/80 R |
| 3,640,729 | 2/1972 | Ronai et al. | 99/83 |
| 3,790,690 | 2/1974 | Fritze | 426/457 |
| 3,887,714 | 6/1975 | Kelly et al. | 426/72 |
| 4,413,018 | 11/1983 | Webster | 426/618 |
| 4,664,931 | 5/1987 | Karwowski et al. | 426/621 |
| 4,734,294 | 3/1988 | Spiel et al. | 426/620 |
| 4,756,920 | 7/1988 | Willard | 426/549 |
| 4,824,683 | 4/1989 | Hodgson et al. | 426/62 |
| 4,874,624 | 10/1989 | Conroy et al. | 426/457 |
| 4,957,762 | 9/1990 | Finnerty et al. | 426/457 |
| 4,978,543 | 12/1990 | Finnerty et al. | 426/243 |
| 4,996,063 | 2/1991 | Inglett | 426/21 |
| 5,132,133 | 7/1992 | Huber et al. | 426/241 |

FOREIGN PATENT DOCUMENTS

37579/72  7/1973  Australia .
8801143  11/1990  Sweden .

OTHER PUBLICATIONS

Fritsch, C.W. and Gale, J.A., "Hexanal as a Measure of Rancidity in Low Fat Foods" *Journal of the Americal Oil Chemists' Society*, 54:225–228 (1977).

Harper, J.M., "Food Extruders and Their Applications," in *Extrusion Cooking*, Mercier, C. et al. (eds)., American Association of Cereal Chemists, Inc. (USA), 1989, pp. 1–15.

Kent, N.L. and Evers, A.D. "Technology of Cereals: An Introduction for Students of Food Science and Agriculture" (4th Edition) Pergamon, B.P.C. Wheatons Ltd. Exeter (1994), pp. 246–248.

*Primary Examiner*—George C. Yeung
*Attorney, Agent, or Firm*—Marshall, O'Toole, Gerstein, Murray & Borun

[57] ABSTRACT

A process for producing fully and uniformly gelatinized hulled oats comprising the steps of:

(i) adding water to the oats; and (ii) subjecting the moist oat product of step (i) to sufficient temperature and pressure for a suitable period of time to cause full and uniform gelatinization of the oats.

26 Claims, No Drawings

PROCESS FOR PRODUCING FULLY GELATINIZED HULLED OATS

THIS INVENTION relates to processing of oat products and in particular to processes of preparing oat products for subsequent use such as human consumption.

The invention has been devised particularly, although not necessarily solely, for preparing oat products for use as cold or hot breakfast cereals, instant snacks, instant cereal drinks, and as ingredients in biscuits and cooking generally, baby food products, pasta, noodles and in various other known applications for oat products.

Oats have traditionally been used as a hot breakfast cereal in the form of oatmeal or porridge. However, in many homes and public dining places it is not served due to the considerable time required for its preparation and the subsequent cleaning of the utensils. Furthermore, once prepared oatmeal has poor keeping qualities and tends to become pasty and undesirable in a relatively short period of time.

Recent medical reports have shown that oat bran is capable of lowering cholesterol in humans. In addition, oat bran is a highly nutritious product, both in terms of possessing outstanding water soluble fibre levels and the richness of its protein, mineral and lipid content.

Generally the stability of oat products is reliant upon the inhibition and avoidance of enzymatic and oxidative reactions which may occur when the grain is damaged. While heating may seem a straightforward alternative to deactivate the enzymes, some processing techniques have been found to aggravate the enzymatic and oxidative reactions. For example, some heat treatments are capable of inhibiting the enzyme, but accelerate the oxidative rancidity development. Enzymatic reactions involving, for example, lipolytic enzymes occur relatively slowly at low moisture and low temperature, and unless inactivated, or removed, these reactions may lead to rancidity by the production of large quantities of free fatty acids. The rate of rancidity development is reported to be accelerated by high moisture levels and by high temperatures. Furthermore, the rancidity of oats, atributable to oxidation, can occur even more rapidly under low-moisture and high-eat conditions.
deactivate active enzymes in oat bran (eg lipase and tyrosinase), involves steaming the hulled oats in the presence of heat (eg 100° C.) for 1 to 3 hours.

Further harsh heat treatment of hulled oats leads to the destruction of antioxidants and shortening of the shelf life of the finished product.

If, for example, stabilised hulled oats are microwaved, they achieve a very desirable characteristics for consumption including a crispy texture, a smooth feel in the mouth, and a nutty flavour and aroma, but will become rancid within a few weeks in hot weather.

Most products made from stabilised hulled oats are flaked and eaten as various forms of cooked porridge, mueslis or muesli bars. The flaked oats have a raw chewy texture and retain the chewiness even after toasting. This rawness is most probably the single-most important reason why oats have not become more prominent in the cereal market.

Some products have been made from hulled oats, without first stabilising the enzymes. Such techniques usually involve boiling the hulled oats in water. This partially gelatinises the starches (see U.S. Pat. No. 4,413,018). However, no development has taken place to develop a suitable fully uniformly gelatinised hulled oat grains.

The major reasons behind the fact that oat products were not developed from gelatinised hulled oat grain was, firstly, that the properties and benefits of evenly and fully gelatinised hulled oat grain were not known, studied or understood. Secondly, no processes were discovered to dry the gelatinised hulled oat grain in a manner which retains the structure of the grain suitable for down stream processing. Thirdly, no processes were discovered to prepare the gelatinised hulled oat grain for flaking into a ready to eat cereal or stretched into a biscuit type material. Fourthly, the traditional way of oat usage was as porridge-type hot cereal.

The present invention provides a process to fully and uniformly gelatinise hulled oats in a manner rendering the product suitable for further processing such as into cold and hot cereals. The invention also provides processes for preparing a range of ingredients for breakfast cereals, snacks, baking, cooking, baby foods, pasta, noodle and other related products using the fully and uniformly gelatinised hulled oats.

The present invention consists in a process for producing fully and uniformly gelatinised hulled oats are translucent in appearance and of uniform brown colour, the process comprising the steps of. (i) by adding water to the oats; and (ii) subjecting the oat product of step (i) to sufficient temperature and pressure for a suitable period of time to cause full and uniform gelatinisation of the oats.

The quantity of water added to the pressure vessel varies according to the intended application or further processing stage of the gelatinised hulled oats. However, an added water content of about 1 to 50 percent is preferred. Typically the water content is about 6 to 25 percent.

Lighter and darker colours are possible by varying the amount of water used, the temperature of the added steam, the cooking pressure and the cooking time Additives such as sugar, salt, malt, non-volatile flavouring, spices or any other food ingredient capable of enhancing flavour, taste, texture, mouth feel, flaking properties may be added before or during the pressure cooking stage.

Removal of surface moisture and slight drying is achieved after the cooking by contacting the oats with air. The air is preferably warm air, but at a temperature which does not alter the surface structure of the oats.

Retention time is then allowed to achieve moisture equilibrium of the gelatinised hulled oat.

More particularly, of the invention consists in a process of preparing hulled oats to achieve full and uniform gelatinisation thereof comprising the steps of. cooking moist hulled oats under pressure in an environment containing steam for a suitable period of time to cause full and uniform gelatinisation of the oats; contacting the oats after cooking thereof with air to initiate drying thereof and to remove surface moisture on the cooked oats; and allowing the drying process to continue before further processing of the oats until such time as the oats have a substantially uniform moisture content through their structure.

Full and uniform gelatinisation may be achieved at a range of different temperatures and pressures. Preferably, the oats are uniformly heated utilising steam at a temperature of about 100° C. to 180° C., and more preferably at a temperature of about 110° C. to 140° C. It will be appreciated that the oats may be uniformly heated by methods other than steam which are well known in the art.

The process of the invention is also carried out under pressure. Preferably that pressure is in the order of about 0.5 to 5 bar. Typically the cooking process is carried out under a pressure of about 1.5 to 3 bars.

The actual time required to achieve a full and uniform gelatinised product will depend on the moisture level of the oat variety, pressure vessel size and design, quality of steam, temperature control and the desired colour of the finished product. Be that as it may, the cooking process should take place for about 10 to 120 min. Preferably, the actual time is about 1.5 to 80 min and more preferably 20 to 40 min.

The fully and uniformly gelatinised hulled oats may then be processed in one of several possible further processing stages.

In one further processing stage, the gelatinised hulled oats are further dried under the influence of heat, retained to allow moisture equilibrium, still further dried under the influence of heat and cooled thereafter to ambient temperature. The process of gradually and gently removing moisture after the steaming process, preserves the antioxidants in the product and gives it a very special aroma, texture, mouth feel and water absorption capacity.

The dried gelatinised hulled oats have various uses, for example, the dried hulled oats can be:

(a) used as a quick cooking cereal;
(b) processed further to make a meal for an instant drink or baby food;
(c) microwaved and coated for an instant snack;
(d) be toasted and coated for an instant snack; or
(e) puffed and coated for an instant snack.

Additionally, the dried gelatinised hulled oats may have oat bran extracted by traditional methods with refined oat flour as a by-product.

Shelf lives of dried oaten products like other oil containing food items including cooking oils are largely influenced by their antioxidant contents. When the antioxidants are used up, even in only portion of a grain product the onset of rancidity follows rapidly, the speed being temperature influenced. The data presented in U.S. Pat. No. 4,413,018 shows that it is easy to produce material which shows destabilisation due to accelerated oxidative rancidity. Boiling or steaming oats followed by drying with various air jet drying regimes shows that increasing the drier time or increasing the drier temperature destabilises the products. Similarly processing oats merely by the use of jet drier alone shows that the harsher the total thermal treatment the more likely the appearance of oxidative rancidity. When drying the product of the present invention, drying should be achieved by the use of lower drier drying temperatures used for short periods followed by rest periods to permit moisture movement from the relatively damper interior to the drier surface regions of the grain, followed by repeated drying—resting cycles until the grain moisture content has reached a level which ensures microbiological safety.

The treatment prescribed by the above drying process when strong enough gives a grain which has a pleasant chocolate aroma. This non artificially added aroma has not been reported before in oaten products.

While the people do not normally eat straight dry oaten groats it has been found that dried fully and uniformly gelatinised oat products cook readily in boiling water for 10 to 15 minutes give a nutty flavoured, chewy product similar but more nutritious than cooked brown or white rice. The taste and texture while similar to rice are not identical and so increase the variety of cooked grain products available to people wishing to carry out the dietary recommendations given around the world to eat more or to ensure a significant part of one's diet consists of wholegrain products.

In another further processing stage, the fully and uniformly oat groat gelatinised may be steamed and flaked. This provides ready-to-eat instant flakes or the flakes may be coated and toasted for other uses in a conventional oven. The flaking process results in a flake with a unique texture, taste, aroma, mouthfeel and is suitable as either a hot or cold cereal.

Fully and uniformly gelatinised groats retaining a minimum of 20% moisture after the gelatinising process may be flaked by conventional milling methods using for example a one to one gear ratio and 300 mm diameter rollers on a flaking machine. After flaking the product-is preferably dried to a moisture content of about 10 to 12%.

The flakes produced by this method are unique and different from traditional oats. Traditional oat flakes are white to slight golden colour, floury in texture, raw when chewed and with no aroma. They are typically used as a hot cereal whereby one needs to cook them from 2 to 10 minutes before eating.

Fully and uniformity gelatinised groats when used in the described flaking process produce a totally new and unique flake not previously associated with oats. The flakes are of a light amber appearance and when broken little white starch is visible. They have a biscuity texture and slight malty aroma. They are no longer raw and can be eaten dry or with liquids, hot or cold. There are a lot more water absorbent than traditional oat flakes so they will cook a lot faster for the same flake thickness.

In still another further processing stage fully and uniformly gelatinised hulled oats may be steamed and stretched to provide, for example, biscuit-type flakes, ready for compressing into a biscuit form and baking. The stretched flakes are also coated and toasted in a stream of hot air to give a flake similar to wheat or corn. The stretch flaking process also results in a Fake with a unique texture. taste, aroma, and mouthfeel for cold cereal and biscuits.

Fully and uniformly gelatinised groats retaining a minimum of 25% moisture after the gelatinising process may be stretch flaked by conventional milling methods using for example a differential gear ratio and 300 mm diameter rolls on the flaking machine.

After flaking the product is toasted in conventional ovens, cooled and packaged into retail packs, or alternatively compressed into rectangular biscuits, toasted in conventional ovens, cooled and packaged into retail packs.

The flakes produced by this method are unique and different from traditional oats. Traditional oat flakes are white to slight golden colour, floury in texture, raw when chewed and with no aroma. They are typically used as a hot cereal whereby one needs to cook them from 2 to 10 minutes.

Fully and uniformly gelatinised groats when used in the described stretch flaking process produce a totally new and unique flake not previously associated with oats. The flakes are of a light amber and translucent appearance and when broken, little white starch is visible. They have a biscuity texture and a slight malty aroma. They are no longer raw and can be eaten dry or with liquids, hot or cold. They are a lot more water absorbent than traditional oat flakes so they will cook a lot faster for the same flake thickness. When compressed and formed into rectangular biscuits and toasted, they produce a truly biscuity textured bix (breakfast biscuit) not previously associated with oat product.

By uniformly and completely gelatinising starches in hulled oats by the process according to the invention, a new range of oat products with very desirable nutritional and marketing properties, can be produced.

The major part of food energy in vegetable material normally is in the form of starch. However, for people to obtain the complete benefit of this starch It must be first digested by starch splitting enzymes (eg amylolytic enzymes) to convert the starch first to oligosaccharides and then to simple sugars. It is the simple sugars which the body can actually absorb. Before the amylolytic enzymes are able to function they must actually reach the starch. However the starch Is stored in starch granules which are surrounded by a wall which the starch splitting enzymes cannot penetrate. The starch granule wall has to be broken before effective digestion can start.

Starch granules are susceptible to mechanical damage during grinding and milling which changes some properties of the oat product but only when heated in the presence of moisture. The process by which the granules absorb water, swell and burst is recognised as gelatinisation. According to the present invention, the extensive exposure to damp heat during gelatinisation leads to complete deactivation of all the enzymes involved in reducing shelf life—the lipase and peroxidises.

Fully uniform gelatinisation of the oat product enables more complete utilisation of the oat grain. This involves the recommended complex carbohydrates, which have a valuable role in maintaining health. The increased digestibility makes the products produced as a result of the invention an ideal ingredient for infants, children and people with digestive problems.

The significant amount of starches made available in the oat products of the present invention may also be converted to resistant starches. Resistant starches by not being digested until the food reaches the large intestine has some of the properties of dietary fibre and is considered to add in preventing colon cancer. Overall the effective dietary fibre content rises from approximately 11% of the conventionally processed oats up to around 19% by use of the present invention Oat products produced from processes according to the invention have improved properties in comparison to the oat products provided according to prior art processes. The improved properties include the following:

(1) Greater resistance to oxidative rancidity.

This is conducive to application in microwaved instant snacks and products subjected to high process temperatures eg. extrusion, baking etc (2) Improved shelf life.

It is believed that the shelf life will improve by 60% to 100% on traditional oat products. This has application across the whole spectrum of oat products.

(3) Improved digestibility.

This is conducive to application in baby cereals, hospital diets, nutritional snacks, performance products.

(4) Can increase in the overall effective dietary fibre content by approximately 70%.

This is conducive to application in nutritional product aiming at cholesterol reduction, diabetic foods, cereals with a high nutritional profile.

(5) Significantly higher viscosity.

This will improve performance in extrusion and wherever binding properties are required.

(6) Significantly higher water absorptivity.

This is conducive to application in instant drinks, bread making, baking, instant cereals, cold cereals.

(7) Improved texture, aroma and taste.

This is conducive to application in hot and cold cereals, biscuits, flakes, flour, bran, roasting and toasting.

According to a second aspect the invention provides a fully and uniformly gelatinised oat product produced by mixing water with hulled oats and then subjecting the moist oat to sufficient temperature and pressure for a suitable period of time to cause full and uniform gelatinisation of the product.

According to a third aspect of the invention there is provided an oat product characterised in that the starches thereof are fully and uniformly gelatinised.

The invention will be better understood by reference to the following description of several specific examples.

It will be understood that all ranges of temperature, pressure, time and moisture levels prescribed in the various examples are given as indicative only, and that parameters outside these limits may also provide useful results.

In the description, percentage moisture is given on a dry weight basis and all additives are given as percentage weight.

EXAMPLE 1

This example is directed to processing of hulled oats (either enzyme stable or green) to produce a fully and uniformly gelatinised hulled oats product. The process provides the product of the invention using a steam cooking process with minimum addition of water, and a gradual drying after full gelatinising has been reached.

The steam cooking process is performed in a pressure vessel so designed that the product exposure to steam and the steam distribution are both very uniform. Typically, 6 to 12% of water is added to the hulled oats for the cooking process. With such an arrangement steam is used as the heating and pressurising medium. The cooking process is carried out under a pressure of about 1.5 to 3 bar.

The temperature range is from about 110° C. to 140° C. and the oats are cooked in the pressure vessel for between about 20 and 40 minutes.

The actual time required depends on moisture level, oat variety, pressure vessels size and design, quality of steam, temperature control and the desired colour of the finished product.

Other ingredients such as malt, sugar, salt, non volatile flavouring, spices or any other food ingredient capable of enhancing flavour, taste, texture, mouth feel, flaking or binding properties, are added before and/or during the pressure cooking stage.

The cooked product is fully and uniformly gelatinised when it is totally translucent and of a uniform brown colour. No white streaks should be visible and the cross-section is fully gelatinised without any trace of chalky white endosperm.

Once full gelatinisation has occurred, the product is released from the pressure vessel and a process of gradual uniform moisture reduction begins. During this stage in the process the product is gradually dried by uniformly blowing warm air (at about 40 to 50° C.) through the product for a period of about 20 to 60 minutes. The length of time required to reduce the moisture in the product will be dictated by the moisture content required in the fully and uniformly gelatinised oat product. Gentle moisture reduction is necessary as the heat used in moisture removal in some of the products produced using the invention alters the structure of the outer layers to the detriment of down-stream processing. It also depletes the anti-oxidants and thus reduces the shelf-life of the finished product.

Minimal steaming regimes found to achieve complete and uniform gelatinised oaten groats are exemplified in the following table. (Starting material—hulled Mortlock oats of circa 10% moisture, grown in Western Australia):

| TIME PRESSURE COOKING IN MINUTES | PRESSURE TEMPERATURE | AMOUNT OF ADDED WATER |
| --- | --- | --- |
| 25 | 260 kpa/144 degrees C. | 10% |
| 19 | 245 kpa/138.5 degrees C. | 15% |
| 15 | 210 kpa/135 degrees C. | 40% |
| 20 | 210 kpa/135 degrees C. | 20% |
| 30 | 219 kpa/135 degrees C. | 10% |
| 40 | 160 kpa/129 degrees C. | 15% |
| 60 | 110 kpa/122 degrees C. | 20% |

Gelatinisation was determined by change in the appearance of the endosperm of the cut groat Such changes had previously been checked to ensure this correlation by having the degree of gelatinisation checked by being placed in a fixative solution for four days, then sectioning on a cryostat microtome, stained with selected histochemical reagents (eg iodine) and examined under a high powdered microscope.

As would be expected the gelatinisation process which involves the swelling of the starch granules in the grain to past bursting point is time, temperature and moisture dependent. The greater the moisture and the higher the temperature the faster the water will move into the granules.

EXAMPLE 2

This example provides a fully and uniformly gelatinised hulled oat product that may be used as groats, kibble groats, bran and flour.

The method of example 1 was repeated. The resultant product was then pneumatically conveyed to and retained in a Stainless Steel Bin wherein sweating of the product was allowed to occur. The groat was then passed on to a retention belt for between 1 and 4 hours. This allows a uniform moisture distribution to take place. Moisture levels of about 15 to 18% are achieved in this stage.

The second stage involves drying with hot fluidising air (about 60° C. to 80° C.) for about 10 to 15 minutes. Alternatively an infra-red drier may be used. The product is then retained in a Stainless Steel bin for about 1–2 hours to allow a uniform moisture distribution to take place. Moisture levels of 12 to 15% are obtained in this stage.

The third stage involves a single-step drying and cooling procedure with fluidising hot and ambient air. Alternatively, infra-red drier with a surface coater is used, followed by cooling with ambient air. Maximum moisture level after this stage is 12%.

The product obtained from this process has a very smooth texture, biscuity taste, and nutty aroma. The product can be puffed in a microwave to give an instant snack. The product is very water absorbent and after grinding will give an instant cereal drink which is aromatic with biscuity flavour and texture.

The finished products cooking time is close to most rice varieties and Its texture after cooking resembles that of rice, it therefore is an ideal ingredient in a rice mixture.

Due to its reduced cooking time, the product is an ideal ingredient for soups.

EXAMPLE 3

This example is directed to processing of green hulled oats to produce gelatinised hulled oats as flakes.

The process provides an oat flake by first fully and uniformly gelatinising green hulled oat grains, flaking, drying and cooling the product.

The process incorporates uniform gelatinising of hulled oats in a steam cooking process using a pressure vessel similar to the one used for Example 1 with sufficient water addition to enable flaking. Typically, about 20% to 30% of water is added to hulled oats in this example.

In the cooking process, the hulled oats are pressurised at about 1.5 to 3 bar pressure using steam as heating and pressurising medium.

The temperature range is from about 110° C. to 140° C. and the cooking process in the pressure vessel proceeds for between about 20 and 40 minutes. The actual time required depends on moisture level, oat variety, pressure vessels size and design, quality of steam, temperature control and the desired colour of the finished product.

As with Example 1, other ingredients such as malt, sugar, salt, non volatile flavouring, spices or any other food ingredient capable of enhancing flavour, taste, texture, mouth feel, flaking or binding properties, are added before and/or during the pressure cooking stage.

Once full gelatinisation is achieved, the product is released from the pressure vessel.

Moisture is then partially removed by blowing warm air (at about 40 to 50° C.) through the product for about 20 to 60 minutes.

The moisture level after this stage of the process is about 25 to 35%.

The product is then steamed in a conditioner or steaming column and flaked using conventional oat flaking roller. A roller having a roll diameter of a minimum of 500 mm and a single gear ratio is particularly suitable. Alternatively the product may be prepared using the same process, but without the steaming process.

A range of flake thickness is produced from 0.2 mm to a slightly bumped product.

The product is then dried to a maximum of about 12% moisture and cooled to ambient temperature. This can be achieved by subjecting the product to hot and cold fluidising air. Alternatively, the drying may be performed by an infra-red drier and subsequent cooling by ambient air.

The flakes obtained from this process are unique in its texture, taste, mouth feel, liquid absorption, aroma and appearance.

They have a natural advantage in almost all areas where conventional oat flakes are used.

EXAMPLE 4

This example is directed to processing of green hulled oats to produce gelatinised hulled oats as stretched flakes.

This process provides a stretched oat flake by fully and uniformly gelatinising green hulled oat grain, flaking, drying and cooling the product.

The process incorporates uniform gelatinising of hulled oats in a steam cooking process using a pressure vessel similar to the one used for Example 1 with sufficient water addition to enable flaking. Typically, about 25 to 40% of water is added to the hulled oats in this example.

As with Examples 1 and 2, the hulled oats are pressurised in the cooking process at about 1.5 to 3 bar pressure using steam as the heating and pressurising medium.

The temperature range is from about 110° C. to 140° C. and the cooking process in the pressure vessel proceeds for between about 20 and 40 minutes. As with the earlier Examples time required depends on moisture level, oat variety, pressure vessels size and design, quality of steam, temperature control and the desired colour of the finished product.

As with Examples 1 and 2 other ingredients may be added before and/or during the pressure cooking stage.

Once fully gelatinisation has occurred, the product is released from the pressure vessel.

Moisture is then partially removed by blowing warm air (at about 40 to 50° C.) through the product for about 20 to 60 minutes.

The new moisture level after this stage of the process is about 30 to 45%.

The product is then steamed in a conditioner or steaming column and flaked. Preferably, the flaking stage is performed using chilled walls flaking rollers with a minimum 500 mm dia. rolls and a differential gear ratio. Alternatively the product may be prepared using the same process, but without the steaming process.

A fine flake thickness is produced from about 0.1 mm to 0.2 mm.

The stretched oat flakes are either coated and toasted, or made into a biscuit and baked in an oven.

The stretched oat flakes are toasted in a hot air stream to give a uniform toasting and partially blister the surface.

The stretched oat flakes are compressed with rollers and formed in a 15 to 20 mm bed on a wide conveying tray. Rectangular shapes are cut on the tray, the product fed into a conventional biscuit oven.

The products made from stretched oat flakes are unique in taste, texture, aroma and mouth feel and will be able to compete with the traditionally made wheat and corn flakes as well as with the wheat biscuits.

EXAMPLE 5

Investigation of viscosity properties of products made from the present invention versus conventional oaten products (all made from Western Australian grown Mortlock oats) using a New Port Scientific RBA-3D viscometer.

Each of the oaten products were mixed with water (65° C.) 4 g in 25 ml water and left for 2 minutes. The temperature of the mixture was then raised quickly to 95° C. After nine minutes the temperature of the mixture was gradually reduced to 50° C. (took approximately 12 minutes). Then gradual temperature was stopped after a further 15 minutes.

Viscosity is expressed in stirring number units SNU, to convert to centipoise multiply by 9.75.

| | Peak viscosity (SNU) | Peak time (mins) | Holding viscosity (SNU) (95° C.) | Maximum Setback (SNU) (50° C.) | Final Setback (SNU) (50° C.) | Peak viscosity Final Setback |
|---|---|---|---|---|---|---|
| Fully and uniformly gelatinised | 294 | 5.5 | 202 | 482 | 482 | 0.61 |
| Wholemeal oat flour | 285 | 5.5 | 198 | 473 | 472 | 0.60 |
| Instant oat drink base (ground through a 2 mm screen) | 300 | 5.4 | 187 | 450 | 450 | 0.67 |
| Instant rolled oats (ground through a 2 mm screen) | 290 | 5.4 | 185 | 445 | 445 | 0.65 |
| Instant oat drink base (produced from fully and uniformly gelatinised oats) | 302 | 5.4 | 191 | 470 | 470 | 0.64 |
| Instant rolled oats | 278 | 5.5 | 180 | 447 | 447 | 0.62 |

As can be seen there is always a higher viscosity seen in the oaten products which have been subject to the gelatinisation process of the present invention. This however is not as high as expected and there exists the possibility that the high amount of beta-lucan found in Mortlock oaten kernels (average 4.7% on a dry weight basis) could be interfering with the gel-matrix being formed in solution by the starch of the oats. Thus the difference in solution viscosity between conventional and oat products produced from the present invention will almost certainly be greater when cultivars with lower levels of beta-glucan are utilised.

EXAMPLE 6

Investigation into the properties of solutions made using oaten material which has been subject to the method of the present invention using a New Port Scientific RBA-3D viscometer.

In order to obtain a suitable thick or viscous drink to satisfy customer expectations for certain instant and quick dissolving drink products certain attributes are required. The solutions must not only be thick enough, they must also hold their viscosity for a reasonable length of time.

All samples were run with 4 g of ground oats (ground through a 0.5 mm screen) in 25 mls of water. Solutions were made up at room temperature or 60° C. where necessary and cooled back to room temperature where necessary.

Viscosity is expressed in stirring number units (SNU), to convert to centipoise multiply by 9.75.

Cooled sample had a viscosity of 63 SNU>

| SOLUTION TEMPERATURES AND TIME (IN HOURS) VERSUS VISCOSITY SOLUTION | | | | | | | |
|---|---|---|---|---|---|---|---|
| 0 HR | SNU | 1 HR | SNU | 3 HRS | SNU | 6 HRS | SNU |
| RT | 78 | RT | 161 | RT | 170 | RT | 150 |
| 60° C. | 106 | RT | 194 | RT | 192 | RT | 165 |
| 60° C. | 106 | 60° C. | 87 | RT | 154 | RT | 137 |
| 60° C. | 106 | 60° C. | 93 | 60° C. | 65 | RT | 114 |
| 60° C. | 106 | 60° C. | 91 | 60° C. | 63 | 60° C. | 39 |

RT = room temperature circa 25° C.

Thus for the better effect in the short term it is preferable to make up drinks with hot (60° C.) rather than cool (25° C.) water. While a solution made with cool water improves with time it still does not match that made up with hot water and then allowed to cool. However, keeping the solution at 60° C. resulted in a poorer drink product than if the hot drink was allowed to cool. That is samples heated to 60° C. decreased in viscosity with holding at that temperature, but became more viscous when the temperature was reduced to room temperature.

The viscosity of the heated drink allowed to cool remained stable for at least three hours.

Samples held at room temperature increased in viscosity over three hours but then began to decline possibly due to enzymatic breakdown.

EXAMPLE 7

Resistant Starch in products produced from the present invention and conventional products:

Using the Megazyme method of resistant starch measurement, which gives the difference of total starch and "available" or enzymatically digestible starch. Data is expressed on a dry weight basis. The term slow cooling refers to the period after the hot pressure steam treatment whether the groats were permitted to remain in the steaming vessel for a period of approximately 8 hours or more.

| Oaten Sample | Resistant Starch Content |
| --- | --- |
| Fully and Uniformly Gelatinised groats non slow cooling | 4.6% |
| Fully and Uniformly Gelatinised groats slow cooling | 8.4% |
| Fully and Uniformly Gelatinised groats slow cooling | 8.9% |
| Porridge Oats | 2% (published result)* |

*Englyst H N, Kingman, S M and Cummings J H - Classification and measurement of nutritionally important start fractions. European Journal of Clinical Nutrition, 1992, volume 46. Supplement 2, S33–S50.

The higher level of resistant starch in the slow cooled sample is not unexpected as resistant starch is due to crystallised starch chains whose crystallisation development is dependent on temperature, starch concentration and moisture concentration (sufficient moisture must be present for chain movement and rearrangements to take place). The published result refers to a product which has been more processed than mere groats however the extra processing should only increase the amount of resistant starch present so the contrast seen above in the amounts between a conventionally processed product and the fully and uniformly gelatinised treated products is almost certainly in reality greater than this.

An advantage of increasing the amount of resistant starch in oaten products is that this raises their actual dietary fibre contents. Resistant acts as a dietary fibre in that it is not digested in the small intestine by the persons own enzymes but is able to be digested by bacterial enzymes in the large intestine. Resistant starch is considered to help prevent colon cancer, possible mechanisms for this include by production of short chain volatile fatty acids such as propionic and butyric acids due to bacterial digestion or possibly by increasing faecal bulk. Overall the effective dietary fibre content for fully and unfirmly gelatinised treated Mortlock wholemeal oaten products goes from approximately 11% to around 19%

EXAMPLE 8

Appearance of Chocolate Aroma under different treatment regimes in stored fully and uniformly gelatinised oats and other oaten groats

| Time of Pressure Cooking in minutes | Pressure of Cooking in kpa | Amount of added water | Temperature of fluid bed drier | Developed Chocolate Aroma |
| --- | --- | --- | --- | --- |
| Kilned groats | atmospheric | 0% | — | no |
| Boiled groats | atmospheric | 200% | 110° C. | no |
| 5 | atmospheric | 200% | 110° C. | no |
| 10 | atmospheric | 200% | 110° C. | no |
| 15 | atmospheric | 200% | 110° C. | no |
| 30 | atmospheric | 200%C | 110° C. | no |

| Pressure cooked groats | | | | |
| --- | --- | --- | --- | --- |
| 60 | 110 kpa | 20% | 50° C. | no |
| 30 | 150 kpa | 0% | 60° C. | faint |
| 30 | 150 kpa | 0% | 60° C. | faint |
| 45 | 150 kpa | 0% | 60° C. | some |
| 40 | 160 kpa | 15% | 50° C. | no |
| 15 | 180 kpa | 0% | 60° C. | no |
| 10 | 210 kpa | 10% | 50° C. | no |
| 10 | 210 kpa | 10% | 50° C. | no |
| 15 | 210 kpa | 40% | 50° C. | faint |
| 20 | 210 kpa | 10% | 50° C. | faint |
| 20 | 210 kpa | 20% | 50° C. | faint |
| 20 | 210 kpa | 10% | 100° C. | some |
| 30 | 210 kpa | 10% | 50° C. | strong |
| 30 | 210 kpa | 10% | 100° C. | slight |
| 40 | 210 kpa | 10% | 50° C. | slight |
| 40 | 210 kpa | 10% | 100° C. | slight |
| 50 | 210 kpa | 10% | 50° C. | strong |
| 90 | 210 kpa | 10% | 50° C. | strong |
| 15 | 300 kpa | 5% | 90° C. | some |

Chocolate Aroma

Some of the samples exhibited quite a strong chocolate like aroma after being stored for a time. The phenomena appeared only in the pressure cooked grain, taking several weeks to appear, though the speed of its appearance was faster in the samples stored at 45 degrees C. than in those stored at room temperature. The temperature effect showing that this is a chemical reaction Or the result of a series of chemical reactions. Though the intensity varied somewhat, it was roughly related to the length of pressure cooking.

An attempt was made to identify the volatile components (s) responsible for the chocolate aroma by gas chromatography-mass spectrometer (volatilise collected into glass lined stainless steel trap packed with Tenax GC [Scientific Glass Engineering Pty Ltd, Australia] Gas chromatography column—Hewlett Packard, HP Innowax, helium carrier gas, introducer temperature 280° C. However the system tried did not prove sensitive enough to Identify such components.

EXAMPLE 9

Investigation of the shelf life of popped groats

Popping was performed by taking approximately 200 grams of groats and placing them in a dish in a microwave oven (approximately 600 watts) set on high and cooking for a period of 25 to 30 seconds, stopping and stirring the groats to help ensure even cooking then repeating the microwaving, beating an stirring until all groats appeared to have been popped. The term green groats means that before popping the groats had been physically hulled but not subjected to any heat treatments.

The shelf life testing was carried in jars and kept at approximately 45 degrees C.

| Starting Material | Microwaving period | Approximate Shelf Life in Weeks | Notes |
|---|---|---|---|
| Green Groats | 130 seconds | 7 to 11 | some burnt |
| Green Groats | 150 seconds | 11 to 13 | none burnt |
| Kilned Groats (3.5 hours kilning) | 130 seconds | 11 to 13 | none burnt |
| Fully and Uniformly gelatinised Groats (50 minutes steaming) | 150 seconds | greater than 56 weeks | none burnt |
| Fully and Uniformly gelatinised Groats, puffed with popping gun | | greater than 26 weeks | |

Fully and uniformly gelatinised groats subjected to a long steaming process under pressure when popped, produce a product with a shelf life about five fold or more longer than popped groats made from conventionally kilned groats or from green groats.

As would be expected the presence of even a small amount of burnt grain is to be avoided as they will significantly shorten the shelf life of a batch of popped groats—for example, see the shelf lives of the two green groat samples in the above table). The decreased shelf life is almost certainly due to the destruction of the antioxidants present in the kernels ensuring an earlier onset of the uncontrolled radical chain reaction oxidisation of the fat present.

The pressure steaming with added water cooking of the oat groats, has altered the structure or nature of the cooked groats such that the product even when subjected to the thermal stress treatment of being popped has a vastly longer (perhaps over five fold longer) shelf life compared to popped kilned oat groats and popped green groats made from the same raw material.

By achieving a shelf life of more than a year, the products become industrially useful (ie they can be produced packaged or incorporated into mixtures (eg mueslis) or incorporated into products (eg muesli bars) and distributed through the retail network (supermarkets etc) and consumed within a reasonable time and before their shelf life is exceeded and they become rancid.

Possible mechanisms explaining the cause of the increased shelf lives of the popped or puffed product produced from fully and uniformly gelatinised oats might include:

(i) The formation of a hard gas impervious or semi-impervious layer hindering oxygen penetration. Quite likely as physical hindrances to oxygen penetration are important in maintaining oat products shelf lives; (The Scientific Journal "Cereal Chemistry" Volume 72, pages 21–24, 1995)

(ii) Mallaid reaction type antioxidant components generated during the higher temperature (circa 120° C. and higher) achieved by processing with steam under pressure: and/or (iii) The processing causes the fat droplets in the groats to be absorbed into the starch matrixes present in the groat cells and so may be limited the oxygen access to the fat material.

It should be appreciated that the scope of the invention is not limited to the scope of the various examples described. In particular, it should be appreciated that various modifications and alterations may be made without departing from the scope of the invention.

The claims defining the invention are:

1. A process for producing fully and uniformly gelatinised hulled oats which are translucent in appearance and of uniform brown colour comprising the steps of:
   (i) adding water to hulled oats; and
   (ii) subjecting the moist oat product of step (i) to sufficient temperature and pressure for a suitable period of time to cause full and uniform gelatinisation of the oats, wherein said pressure is above atmospheric pressure.

2. A process according to claim 1 wherein the water added to the oats in step (i) comprises 1 to 50% of the moist oat product employed in step (ii).

3. A process according to claim 2 wherein the water added to the oats in step (i) comprises about 6 to 25 percent of the moist oat product employed in step (ii).

4. A process of preparing hulled oats which are translucent in appearance and of uniform brown colour and having full and uniform gelatinisation thereof comprising the steps of:
   (i) cooking moist hulled oats under pressure in an environment containing steam for a suitable period of time to cause full and uniform gelatinisation of the oats wherein said pressure is greater than atmospheric pressure;
   (ii) contacting the oats after cooking thereof with air to initiate drying thereof and to remove surface moisture on the cooked oats; and
   (iii) allowing the drying process to continue before further processing of the oats until such time as the oats have a substantially uniform moisture content through their structure.

5. A process according to claim 1 wherein the temperature of step (ii) is about 100° to 140° C.

6. A process according to claim 1 wherein the pressure of step (ii) is about 1.5 to 3 bar.

7. A process according to claim 1 wherein the moist hulled oat product from step (i) is subjected to temperature and pressure in step (ii) for about 20 to 40 minutes.

8. A process according to claim 1, further comprising steps of partially drying the fully and uniformly gelatinised hulled oats from step (ii) under the influence of heat, retaining the partially dried oats to allow moisture equilibrium, drying again under the influence of heat and cooling the oats to ambient temperature.

9. A process according to claim 1 further comprising steps wherein the fully and uniformly gelatinised hulled oats from step (ii) are steamed and then flaked.

10. A process according to claim 1 further comprising steps wherein the fully and uniformly gelatinised hulled oats from step (ii) are steamed and then stretch flaked.

11. A process according to claim 9 further comprising a step of toasting the flaked oat products in a stream of hot air.

12. A process according to claim 1 further comprising a step wherein the fully and uniformly gelatinised hulled oats from step (ii) are puffed.

13. A process according to claim 1 further comprising a step wherein the fully and uniformly gelatinised hulled oats from step (ii) are puffed by heating.

14. A process according to claim 1 further comprising a step wherein the fully and uniformly gelatinised hulled oats from step (ii) are microwaved for sufficient time to pop the hulled oats.

15. A fully and uniformly gelatinised oat product produced according to the process set forth in any one of the claims 1–3, wherein said product is characterized by a chocolate aroma.

16. A process according to claim 10 further comprising a step of toasting the flaked oat products in a stream of hot air.

17. A process according to claim 1, wherein one or more ingredients selected from the group consisting of malt, sugar, salt, and spices is added to the oats before or during the cooking step (ii).

18. A process for producing fully and uniformly gelatinised hulled oats, comprising the steps of:

(i) adding water to hulled oats to provide a moistened oat product;

(ii) heating the moistened oat product at a pressure above atmospheric pressure, and at a temperature sufficient to steam cook the oats, for a cooking time sufficient to produce fully and uniformly gelatinised hulled oats that are translucent and of a uniform brown colour free of white streaks and free of chalky white endosperm.

19. A process according to claim 18, wherein one or more ingredients selected from the group consisting of malt, sugar, salt, and spices is added to the oats before or during the heating step (ii).

20. A process according to claim 18 wherein the water added in step (i) comprises 6 to 25 percent of the moistened oat product.

21. A process according to claim 18 wherein the heating step comprises heating at a pressure of 1.5 to 3 bar, at a temperature of 110° C. to 180° C. for 1.5 to 80 minutes.

22. A process according to claim 18 further comprising a gradual moisture reduction, said gradual moisture reduction comprising at least two drying steps under the influence of heat and a final period of cooling, wherein the drying steps are separated by a retaining period to permit uniform moisture redistribution in the oats, and wherein said gradual moisture reduction reduces depletion of antioxidants in the oats relative to a continuous heat drying procedure.

23. A process according to claim 22 wherein the drying steps comprise contacting the gelatinised oats with warmed air.

24. A process according to claim 22 wherein an infra-red dryer is used in the drying steps to dry the gelatinised oats.

25. A process according to claim 18 wherein step (ii) is performed in a steaming vessel and wherein the fully and uniformly gelatinised hulled oats produced in step (ii) are retained in the steaming vessel for at least 8 hours to increase enzyme-resistant starch content in the gelatinised hulled oats.

26. An oat product produced by the method of claim 18, said oat product characterized by uniform and full gelatinisation, translucence, and a uniform brown colour free of white streaks and free of chalky white endosperm.

* * * * *